GEAR TRANSMISSION WITH MULTIPLE POWER PATHS

Filed Jan. 8, 1970

INVENTOR.
KONRAD LANGENBECK
BY [signature]
Attorney

United States Patent Office 3,626,777

Patented Dec. 14, 1971

1

3,626,777

GEAR TRANSMISSION WITH MULTIPLE POWER PATHS

Konrad Langenbeck, Mulheim (Ruhr), Germany, assignor to Rheinstahl Huttenwerke AG, Essen, Germany Filed Jan. 8, 1970, Ser. No. 1,409
Claims priority, application Germany, Jan. 9, 1969, P 19 00 923.5
Int. Cl. F16h 3/08
U.S. Cl. 74—333 8 Claims

ABSTRACT OF THE DISCLOSURE

The input shaft of a gear transmission having several gear stages, is connected with the output shaft by a plurality of sets each of which has three gears so that power is transmitted in each stage of the transmission over three paths.

BACKGROUND OF THE INVENTION

The present invention relates to gear transmissions, particularly for use with motorcars and trucks whose engines have great power.

There is a trend in automobile design to increase the power of the engines of passenger cars as well as of trucks. Consequently, the gear transmissions have to be accordingly designed, but since the size of the motorcar is not increased, there is no sufficient space for enlarged transmission available, and moreover it is undesirable to place a greater weight of the frame of the car.

Transmissions according to the prior art are known in which the power is divided and transmitted in the transmission along multiple paths resulting in a compact structure.

Satisfactory function of transmissions of this type depends mainly on whether the power of the engine acting on the input shaft of the transmission, is uniformly distributed over the several parallel power paths.

In one construction of the prior art, the input and output shafts of the transmission have to be connected by flexible clutches, and the shifting mechanism is mounted on a freely floating shaft, which has disadvantages.

SUMMARY OF THE INVENTION

It is one object of the invention to provide a gear transmission with multiple power paths which is free of the disadvantages of the prior art constructions, requires little space, and can be used with very powerful engines.

Another object of the invention is to connect the input shaft and the output shaft, of a transmission by sets of gears in meshing engagement with output gears which can be selectively coupled with the output shaft.

With these objects in view, an embodiment of the invention comprises supporting means, preferably including a housing; an input shaft and an output shaft mounted on the housing; an input gear fixed to the input shaft and a plurality of output gears mounted on the output shaft for free rotation; a carrier means mounted on the supporting means, preferably by a universal joint mounted on the housing; a set of transmission shafts mounted on the carrier means for rotation and being spaced about the common axis of the input and output shafts, equal radial and angular distances, preferably 120°; a set of drive gears which are respectively fixed on the transmission shafts and mesh with the input gear so that the transmission shafts are simultaneously driven; a plurality of sets of transmission gears respectively fixed on the transmision shafts and meshing with the output gears, respectively; and clutch means for coupling a selected one of the output gears with the output shaft.

2

By operation of the clutch means, power is transmitted from the input shaft to the output shaft through the input gear, the set of drive gears, the set of transmission shafts, the output gear coupled with the output shaft, and the set of transmission gears which mesh with the coupled output gear.

Due to this construction, the power is transmitted through a plurailty of gear trains, preferably three, between the input shaft and the output shaft in each of the stages of the transmission.

In the preferred embodiment of the invention, the carrier of three transmission shafts is mounted on the housing by universal joint means, preferably a double-jointed gear coupling surrounding the input shaft.

The clutch means preferably include a clutch by which the input shaft can be directly coupled with the output shaft, and other clutches for selectively coupling the several output gears with the output shaft.

The novel features which are considered as characteristic for the invention are set forth in particular in the appended claims. The invention itself, however, both as to its construction and its method of operation, together with additional objects nad advantages thereof, will be best understood from the following description of specific embodiments when read in connection with the accompanying drawings.

DESCRIPTION OF THE PREFERRED EMBODIMENT

Figure 2:
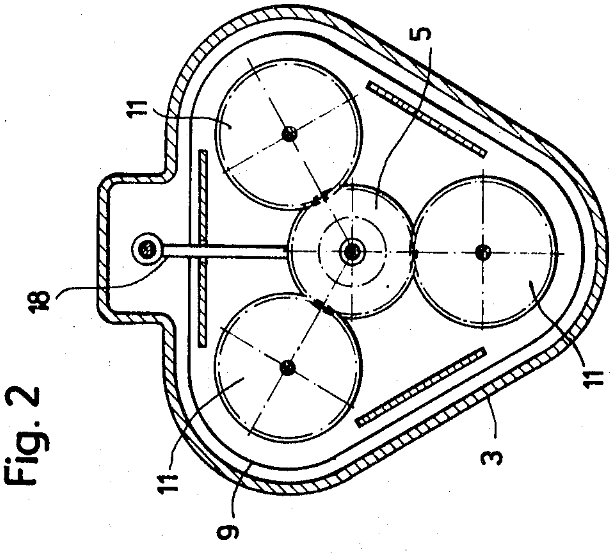
FIG. 2 is a fragmentary cross-sectional view of the embodiment shown in FIG. 1.

An input shaft 1, and an output shaft 2 are mounted in bearings of the housing 3, which is substantially triangular, as best seen in FIG. 2. Output shaft 2 is mounted in a recess at the end of input shaft 1 so that input shaft 1 and output shaft 2 have a common axis.

An input gear 4 is fixedly secured to input shaft 1. Three output gears 5, 6 and 7 are mounted on output shaft 2 for free rotation. Gears 6*a* and 7*a* are secured to output gears 6 and 7, and between the same, a coupling gear 17 is fixed to output shaft 2. A tubular gear sleeve 15 can be shifted between the neutral position shown in FIG. 1 to a first position engaging gear 6*a* and a second position engaging gear 7*a* for coupling output gears 6 and 7, respectively, with output shaft 2.

A gear 5*a* is fixedly secured to output gear 5, and a gear 4*a* is fixedly secured to input gear 4. Between gears 4*a* and 5*a*, a coupling gear 16 is fixedly secured to output shaft 2. A tubular gear sleeve 14 can be shifted between a normal neutral position, not shown, engaging only coupling gear 16, a first position engaging coupling gear 16 and gear 5*a* so that output gear 5 is coupled to output shaft 2, and a second position connected with coupling gear 16 and gear 4*a* so that input shaft 1 is directly coupled with output shaft 2.

A carrier means 9 of general triangular configuration is located in housing 3, and is mounted on the same by means of a crowned gear coupling 8 including gears mounted on housing 3 and carrier 9, respectively, and a tubular gear engaging the same. The gear coupling 8 has the effects of a universal joint permitting displacements of carrier means 9 relative to housing 3, input shaft 1, and output shaft 2.

A set of three transmission shafts 20 is mounted in bearings of carrier means 9 spaced from each other angular distances of 120°, and being equally spaced from the common axis of input shaft 1 and output shaft 2. Each transmission shaft 20 carries a fixed drive gear 10 so that three drive gears 10 mesh with input gear 4, and transmission shafts 20 are continuously rotated.

Each transmission shaft 20 further carries three fixed transmission gears 11, 12 and 13 which respectively mesh with output gears 5, 6 and 7.

Shifting forks 18 and 19 are mounted on a rod 21 in housing 3, and permit independent shifting of tubular gears 14 and 15 in axial direction between a neutral position, and two operative positions.

Figure 1:
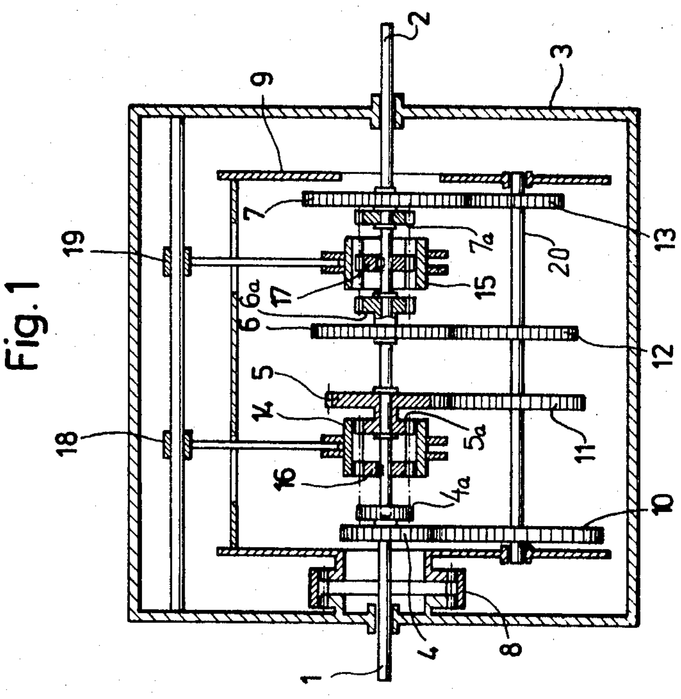
FIG. 1 is a fragmentary schematic axial sectional view illustrating an embodiment of the invention.

As illustrated in FIG. 1, the tubular gear 14 is in a position connecting coupling gear 16, and thereby output shaft 2, with gear 5*a* and thereby with output gear 5 so that the latter is fixed to output shaft 2 for rotation, and the power of the input shaft 1 is transmitted from input gear 4 to output gear 5 through three drive gears 10, three transmission shafts 20, and three transmission gears 11, while output gears 6 and 7 are inoperative.

As explained above, tubular gear 14 can be shifted to a neutral positions, and also to a position engaging gear 4*a* for directly coupling input shaft 1 with output shaft 2 in a direct drive. Tubular gear 15 can be shifted out of the illustrated neutral position to a position engaging gear 6*a* so that the output shaft 2 is driven through output gear 6, or to a position engaging gear 7*a* so that output shaft 2 is driven through output gear 7.

In accordance with the selected number of three gears in each set, the housing 3 and carrier 9 have a substantially triangular shape with rounded corners so that a minimum of space is required.

Due to the fact that carrier means 9 is mounted on housing 3 by means of a flexible joint, it floats on output gears 5, 6 and 7 by means of transmission gears 11, 12 and 13, and also on input gear 4 by means of drive gears 10.

Three units, each including a shaft 20, a drive gear 10, and three transmission gears 11, 12 and 13 transmit the power along three power paths. The meshing engagement of the gears of each unit with the output gears and input gear results in a statically determined system, and the forces transmitted by the teeth displace carrier means 9 until the forces acting on the driving transmission gears and the driven output gears are the same, assuring a uniform distribution of the power. The reaction torque acting on carrier means 9 is transmitted through the coupling 8 to housing 3.

Due to the fact that the input power is distributed over three gear trains, a substantially greater power density than in conventional transmissions is obtained.

It will be understood that each of the elements described above, or two or more together, may also find a useful application in other types of transmissions for transmitting great power differing from the types described above.

While the invention has been illustrated and described as embodied in a gear transmission with a plurality of gear assemblies transmitting torques between an input shaft and an output shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Gear transmission with multiple power paths comprising, in combination, supporting means; an input shaft and an output shaft mounted on said supporting means for rotary movement about a common axis; an input gear fixed on said input shaft; a plurality of output gears mounted on said output shaft for free rotation; non-rotatable carrier means; universal joint means supporting said carrier means on said supporting means; a set of three transmission shafts parallel to said axis mounted on said carrier means for rotation and being spaced about said axis equal radial distances, and angular distances of 120°; a set of three drive gears which are respectively fixed on said transmission shafts and mesh with said input gear so that said transmission shafts are simultaneously driven; a plurality of sets of three transmission gears, the transmission gears of each set being fixed on said transmission shafts, respectively, spaced the same axial distances as said output gears, and the transmission gears on said sets meshing with said output gears, respectively; and clutch means for coupling a selected one of said output gears with said output shaft so that power is transmitted from said input shaft to said output shaft through said input gear, said set of three drive gears, said set of three transmission shafts, the selected one of said output gears, and the set of transmission gears meshing with said selected one output gear.

2. Gear transmission as claimed in claim 1 wherein said supporting means include a housing, said joint means mounting said carrier means on said housing at one end of said carrier means.

3. Gear transmission as claimed in claim 2 wherein said joint means include a double-jointed gear coupling surrounding said input shaft.

4. Gear transmission as claimed in claim 1 wherein said clutch means include a clutch for directly connecting said input shaft with said output shaft.

5. Gear transmission as claimed in claim 1 wherein said clutch means include at least one clutch having two positions for selectively connecting said input shaft directly with said output shaft, and one of said output gears with said output shaft.

6. Gear transmission as claimed in claim 5 wherein said output gears include said one output gear and two other output gears; and wherein said clutch means include a second clutch having two positions for selectively connecting said other output gears with said output shaft.

7. Gear transmission as claimed in claim 6 wherein each of said first and second clutches is a gear clutch including an axially shiftable tubular gear sleeve.

8. Gear transmission as claimed in claim 1 and wherein said supporting means include a substantially triangular housing having three rounded corners in which said transmission shafts are located, respectively, together with said drive gears and transmission gears thereon; wherein said carrier means has a substantially triangular shape fitting into said triangular housing; and wherein said universal joint means mount said carrier means on said housing.

References Cited

UNITED STATES PATENTS

| | | | |
|---|---|---|---|
| 2,543,412 | 2/1951 | Kegresse | 74—331 X |
| 2,731,846 | 1/1956 | Kreis | 74—331 X |
| 3,192,786 | 7/1965 | Stott | 74—333 |
| 3,218,889 | 11/1965 | Jarchow | 74—410 X |
| 3,293,931 | 12/1966 | Beattie | 74—325 |
| 3,352,172 | 11/1967 | Teichmann | 74—410 |

ARTHUR T. McKEON, Primary Examiner

U.S. Cl. X.R.

74—331 (Discl), 363, 375